May 22, 1951 — R. W. STROMBERG — 2,553,686
AUTOMOBILE SPARE WHEEL ASSEMBLY
Filed Nov. 14, 1949 — 2 Sheets-Sheet 1

INVENTOR.
ROLAND W. STROMBERG
BY
Boyken, Mohler & Beckley
ATTORNEYS.

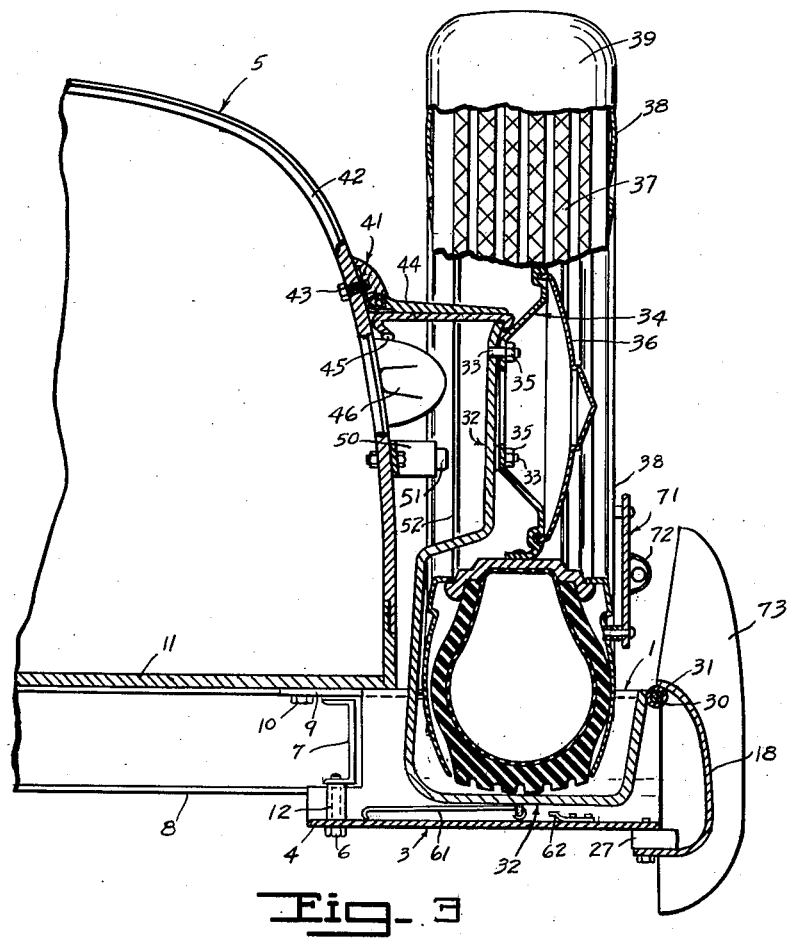
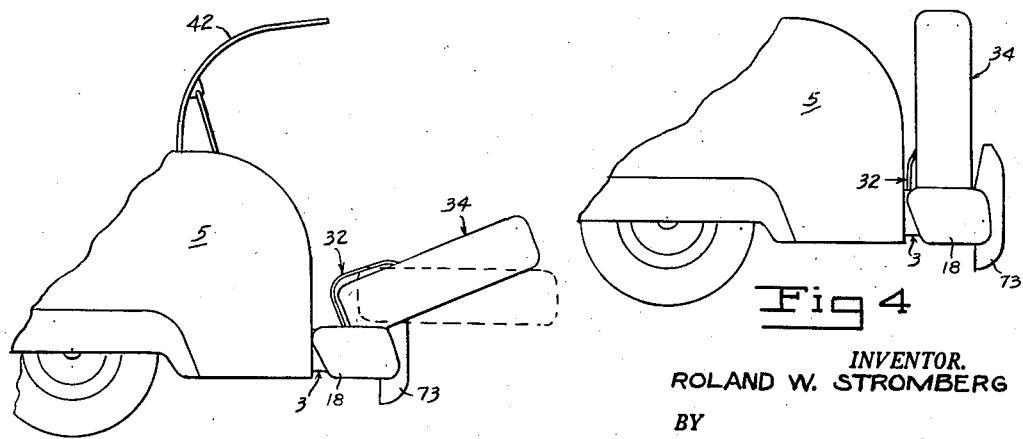

Patented May 22, 1951

2,553,686

UNITED STATES PATENT OFFICE 2,553,686

AUTOMOBILE SPARE WHEEL ASSEMBLY

Roland W. Stromberg, San Francisco, Calif., assignor to Cecil A. Whitebone, San Francisco, Calif.

Application November 14, 1949, Serial No. 126,945

7 Claims. (Cl. 224—42.22)

This invention relates to a device for use on an automobile and more particularly to a mechanism for mounting the spare wheel and tire.

In the early period of the automobile, it was usually the practice to carry the spare wheel and tire externally of the body, but more recently this practice has largely been discontinued. However, even more recently, circumstances have made this practice again desirable and this invention is designed to accomplish this purpose.

In the first place, modern design of automobiles has, in some cases, made it desirable to obtain more internal storage and passenger space. However, with the streamlining of the external body, the problem of externally mounting the spare wheel has been made difficult for lack of a convenient place which would also maintain a pleasant appearance. For example, in some types of bodies the rear deck portion is somewhat square and mounting a spare wheel at that point makes it difficult or impossible to obtain access to the deck.

The present invention is designed to overcome these difficulties and provide a mount or carriage for the spare wheel adjacent the rear deck which provides ample access to the deck.

Thus, one of the objects of the invention is a spare wheel mount for use on the rear end of an automobile which does not interfere with access to the deck.

Another object of the invention is a spare wheel mount for use on the rear end of an automobile which is adapted to swing the wheel away from the deck lid when access thereto is desired.

A further object of the invention is a spare wheel mount for use on the rear end of an automobile mounted on the body or frame thereof and secured in normal position by the deck lid.

Yet another object of the invention is a spare wheel mount for use on the rear end of an automobile which is releasably secured to the deck lid for operation independently thereof.

An even further object of the invention is a spare wheel mount for use on the rear end of an automobile which is secured to the same for swinging away from the deck to provide a temporary shelf in loading the deck.

In the drawings:

Fig. 3 is a vertical longitudinal cross-section view through the rear portion of the automobile showing the invention holding the spare wheel in normal position.

Fig. 4 is a reduced fragmentary elevational view of the automobile showing the wheel in normal position.

Fig. 5 is a reduced fragmentary elevational view of the automobile showing the wheel swung rearwardly of the body in position for permitting opening of the deck lid.

Figure 1:
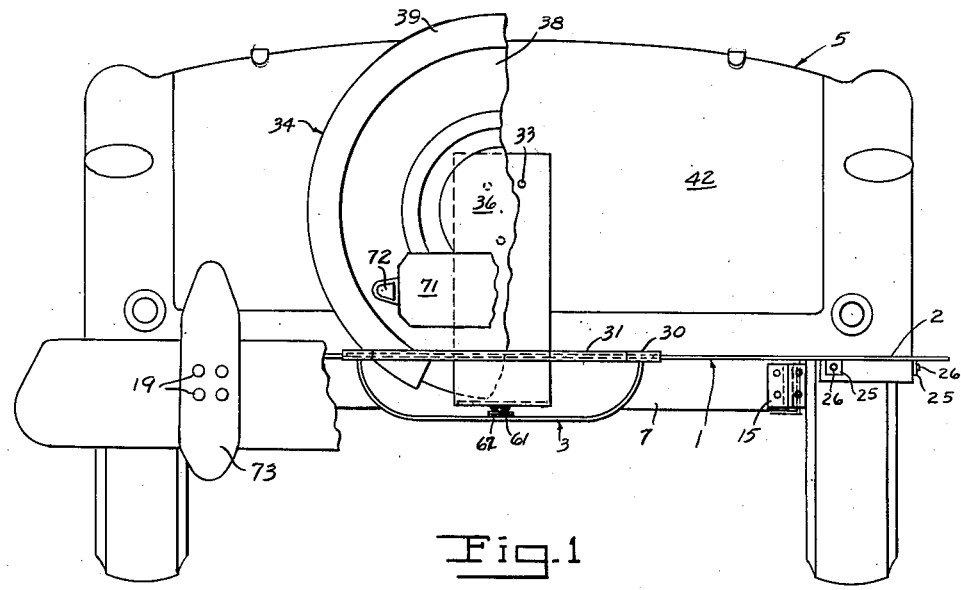
Fig. 1 is a rear elevational view of an automobile showing the invention in place. Portions of the spare wheel and the bumper are broken away to show structure.

In general, the invention disclosed is adapted for use on most conventional automobiles. It provides a mounting for the spare tire secured to the body and/or the gravel shield which mounting may be swung about a horizontal, transverse axis to rotate the mount and the wheel to a substantially horizontal position, back and away from the deck.

The assembly is exceedingly simple and may be applied to most model automobiles with slight or no changes. Usually the gravel shield will have to be provided with a well and extensions may have to be provided to the frame. Otherwise, the assembly may be attached to standard models without modification.

The preferred form of the invention is shown in the drawings, but it is to be clearly understood that this illustrates only one application of the invention and that other forms will be obvious to those skilled in the art. A detailed description of the form shown follows.

As has been stated, the invention generally comprises the application of a mechanism to the rear end of an automobile for the releasable support of a spare wheel and tire on the exterior of the body. The major support is provided by a modified form of gravel shield, generally designated 1, which is supported by the frame and body of the car, which latter words are sometimes used interchangeably herein. The gravel shield support 1 (Fig. 2) is formed from a sheet of relatively heavy metal and comprises two flat sections 2 positioned at either end and shaped to conform to the rear end of the body and the bumper. Between the flat sections, the shield is formed with a well as at 3, to receive the lower end of the spare wheel. The bottom of the well is provided with a relatively flat extension 4, extending under the body of the car, generally designated 5. It is arranged to be secured, as by bolts 6 and spacers 12, to a cross beam 7 secured as by welding transversely between the rear ends of the frame members 8. Each of the flat sections are also provided with extensions 9 (Figs. 2, 3) suitably drilled with holes to receive bolts 10 by which they are secured to the floor 11 of the deck in the body of the car (Fig. 3).

Each of the frame members 8 is provided with a rearwardly extending extension or bumper bracket 15 supported by and connected to the frame 8 by a connecting plate 16 secured to the frame and bracket by bolts 17. Each extension is comprised of two metal bars with their rearward ends bent away from each other for securing to the bumper 18 by bolts 19 (Figs. 1, 2).

Figure 2:
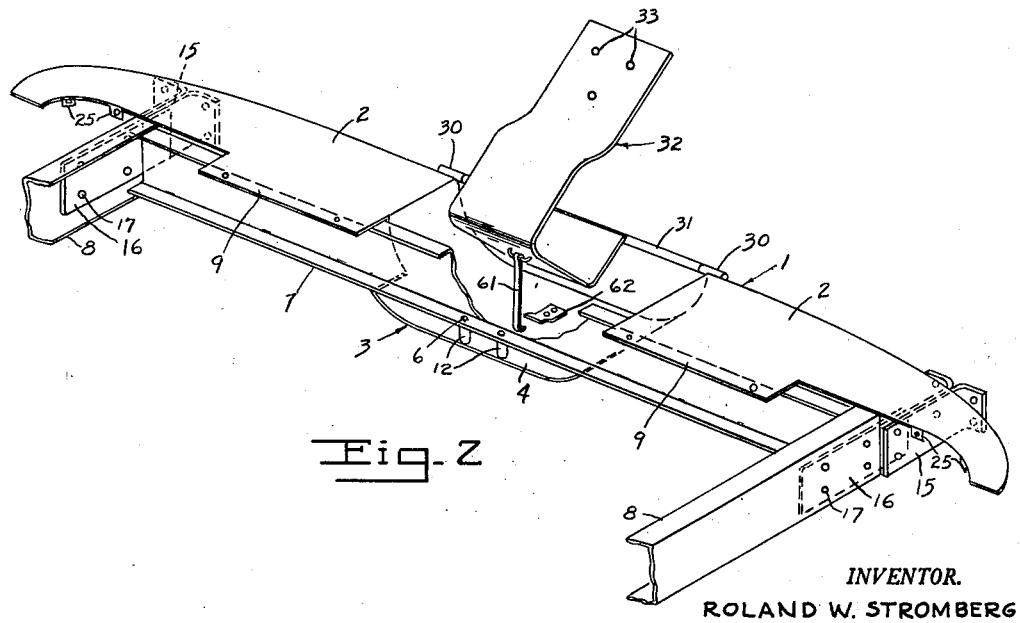
Fig. 2 is a perspective view of the rear portion of the automobile frame showing the invention in place. The body of the automobile and the bumper are removed for clarity.

To further secure the shield in place, the forward end of the flat sections 2 of the shield are provided with downwardly extending apertured tabs 25 for securing the same to the body 5 by bolts 26 (Figs. 1, 2). A rear support 27 is also secured to the bottom of the well 3, as by bolts, for securing the same to the central portion of the bumper 18.

At the rearward edge of each flat section 2 of the shield is secured a support or bearing 30 which may conveniently be a short pipe section. These supports are adjacent the well 3 and are adapted to receive the ends of a pivoted rod 31 (Figs. 1, 2 and 3). Rod 31 is secured, as by welding to the wheel carrier bracket 32. Bracket 32 may conveniently be formed of a relatively wide steel strap and in normal position, extends downwardly into the well 3, horizontally across the bottom thereof, and thence upwardly and again outwardly. At this end it is provided with studs 33 positioned to receive the spare wheel, generally designated 34, which is conventionally secured thereto by nuts 35 (Fig. 3). A hub cap 36 may be conventionally secured to the wheel. The wheel carries the conventional tire 37 which is preferably covered by a conventional metal cover comprising an annular face plate 38 and split guard ring 39.

The carrier bracket 32 is shown in its normal position in Fig. 3 and is secured in such position by a bracket, generally designated 41. Bracket 41 is secured centrally of the deck lid 42 by bolts 43 and is provided with a clamping arm 44 extending rearwardly and over the upper edge of the carrier bracket 32. The bracket 41 is preferably of the spring type to keep it in its most downward position so that the clamping arm 44 snaps over the upper edge of the carrier bracket 32. A stop 45 is secured to the clamping arm which, when it contacts the handle 46 on the deck lid, prevents further downward motion of the clamping arm 44.

To further secure the spare wheel from rattling, a bracket 50 is secured to the deck lid 42 and carries a pair of rubber bumpers 51 at its ends which are arranged to rest against the rim 52 of the wheel when the same is in the position of Fig. 3.

It can now be seen that the spare wheel assembly may be rotated, as a unit about support bar 31 after the clamping arm 44 is released from the carrier bracket 32, and the latter will carry the wheel assembly during such rotation, backwardly and over the bumper 18. The extent of this rotation may be unlimited but it is preferably to provide limiting means to stop the same at a horizontal or some other position as shown in Fig. 5. One form of limiting means is shown comprising a hooked arm 61 which is hinged from the bottom of the carrier bracket 32 and slides along the well 3 during rotation of the assembly about support 31. A catch 62 is secured in the well to engage the hooked arm, as can be seen in Fig. 3. The extent of the motion of the carrier bracket 32 may thus be determined as desired by the proper positioning of catch 62.

The entire assembly may, of course, be conventionally finished by the addition of a license plate assembly 71, having a light 72, and bolted to the face plate 38. In addition, vertical bumper guards 73 may be used in the conventional fashion.

From the above description, the operation of the assembly is obvious. It is noted that the deck lid 42 may be operated conventionally and without disturbing the wheel assembly and vice versa. Or both may be operated together to permit easier access to the luggage compartment.

To operate the wheel assembly, the clamping arm 44 may be released from its securement with the carrier bracket 32 simply by forcing the wheel assembly forward and lifting the arm. This amount of motion is permitted because of the flexibility of the carrier bracket 32 and the yieldability of the bumpers 51. When the bracket is released, the entire wheel assembly may be easily rotated out and over the bumper 18 and away from the deck lid. The extent of the rotation will be, as has been described, limited by the hooked arm 61 contacting catch 62. In this position access to the deck lid is without difficulty and the same may be easily operated. In addition, the spare wheel assembly, if in substantially a horizontal position as indicated by dotted lines in Fig. 5, may conveniently be used as a support or shelf for items being loaded or unloaded. It is also obvious that the deck lid may be operated entirely independently of the carriage assembly.

I claim:

1. In an automobile having a body and a rear bumper spaced rearwardly thereof and extending the width of said body, a horizontally disposed gravel shield between said bumper and said body formed with a well centrally thereof, a support for a spare wheel hingedly secured to said shield for supporting said wheel vertically in said well and for swinging said wheel out of said well to facilitate access to the rear end of said body.

2. In an automobile having a body and a rear bumper spaced rearwardly thereof and extending the width of said body, a horizontally disposed gravel shield between said bumper and said body formed with a well centrally thereof, a support for a spare wheel hingedly secured to said shield for supporting said wheel vertically in said well and for swinging said wheel out of said well to facilitate access to the rear end of said body, said gravel shield being adapted to extend the full length of said bumper and means adapted to be carried by said body for releasably holding said support from swinging.

3. In an automobile having a body and a rear bumper spaced rearwardly thereof and extending the width of said body, a horizontally disposed gravel shield between said bumper and said body formed with a well centrally thereof, a support for a spare wheel hingedly secured to said shield for supporting said wheel vertically in said well and for swinging said wheel out of said well to facilitate access to the rear end of said body, said gravel shield having an outline adapted to conform to the outline of the oppositely facing surfaces of the rear end of said body and said bumper and being in engagement with said body and said bumper for sealing the space between them for substantially the full length of said bumper.

4. In an automobile having a body including a rear deck provided with an upwardly swinging cover swingably connected with said body at its forward end relative to the forward end of said automobile and body, a support for a spare wheel having a tire thereon means on said support for releasably securing said wheel thereto in a vertical position with its central axis extending longitudinally of the longitudinal axis of said automobile, a hinge on said support for swinging said support about a horizontal axis to a position rearwardly of said deck and to a generally horizontally disposed position, means for connecting said hinge to said body including a shield secured to said body in a position below said wheel, said shield being formed to provide an upwardly opening well into which said tire is adapted to project when said wheel is vertical.

5. A spare wheel assembly for the rear end of an automobile having a body that includes a bumper spaced rearwardly thereof, said assembly comprising; an upstanding bracket, means for releasably securing a tire mounted vertically disposed wheel to the upper end of said bracket, said bracket terminating at its lower end at a point alongside the lower portion of said wheel when the latter is secured to the upper end of said bracket, a hinge connected to the lower end of said bracket, means for securing said hinge to said body and for supporting said hinge adjacent to said bumper between said wheel and the latter when said wheel is on said bracket for swinging of said bracket and said wheel from said upstanding and vertically disposed positions respectively, to a position extending transversely across said bumper.

6. A spare wheel assembly for the rear end of an automobile having a body that includes a bumper spaced rearwardly thereof, said assembly comprising; a vertically extending bracket, a hinge having a horizontal pivot, means for connecting said hinge to said body in a position adjacent to said bumper for swinging of said bracket about said pivot from its vertically extending position to a position extending across said bumper, means for securing a vertically disposed tire mounted wheel to said bracket in a position between said hinge and said body when said hinge is in its said position adjacent to said bumper whereby the weight of said wheel on said bracket will tend to swing said bracket toward said body and away from said bumper when the said wheel is on said bracket.

7. A spare wheel assembly for the rear end of an automobile having a body that includes a bumper spaced rearwardly thereof said assembly comprising: a vertically extending bracket, a hinge having a horizontal pivot, a horizontally disposed gravel shield adapted to extend below a vertically disposed tire mounted wheel, said hinge connecting the lower end portion of said bracket with said shield along one edge of said shield, means for releasably securing the upper end of said bracket to a vertically disposed tire mounted wheel for supporting such wheel vertically over said shield for swinging with said bracket downwardly about said pivot to a position extending above and past said one edge, members for securing said shield to said body in a position with said one edge adjacent to and extending along the upper edge of said bumper whereby said bracket will carry said tire to a position extending across the upper edge of said bumper when said bracket is swung downwardly about said pivot from its vertically extending position.

ROLAND W. STROMBERG.

REFERENCES CITED

The following references are of record in the file of this patent:

UNITED STATES PATENTS

| Number | Name | Date |
|---|---|---|
| 1,600,686 | Mach | Sept. 21, 1926 |
| 1,677,765 | Goetz | July 17, 1928 |
| 1,974,599 | Bradford | Sept. 25, 1934 |

FOREIGN PATENTS

| Number | Country | Date |
|---|---|---|
| 520,977 | Germany | Mar. 14, 1931 |
| 653,258 | France | Nov. 8, 1928 |
| 713,135 | France | Aug. 10, 1931 |